US006367009B1

(12) United States Patent
Davis et al.

(10) Patent No.: US 6,367,009 B1
(45) Date of Patent: Apr. 2, 2002

(54) EXTENDING SSL TO A MULTI-TIER ENVIRONMENT USING DELEGATION OF AUTHENTICATION AND AUTHORITY

(75) Inventors: Mark Charles Davis, Durham; David G. Kuehr-McLaren, Apex; Timothy Glenn Shoriak, Cary, all of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/215,601

(22) Filed: Dec. 17, 1998

(51) Int. Cl.[7] .................................................. G06F 1/24
(52) U.S. Cl. ........................ 713/166; 713/152; 713/168
(58) Field of Search .............................. 713/150, 152, 713/161, 164, 165, 166, 168

(56) References Cited

U.S. PATENT DOCUMENTS 5,978,577 A * 11/1999 Rierden et al. ............. 395/610
5,987,247 A * 11/1999 Lau ............................. 395/702
6,012,067 A * 1/2000 Sarkar ........................ 707/103

* cited by examiner

Primary Examiner—Thomas R. Peeso
(74) Attorney, Agent, or Firm—Gregory M. Doudnikoff; Marcia L. Doubet

(57) ABSTRACT

A method, system, and computer-readable code for delegating authority and authentication from a client to a server in order that the server can establish a secure connection (using SSL or an analogous security protocol) to a back-end application on behalf of the client. This enables the true client's identity to be known to the application on the end-tier server. The proposed solution provides several alternative techniques, whereby the client establishes a secure session with a middle-tier server (MTS), and then delegates authority and authentication to the MTS in order that the MTS can establish a second SSL session to the ETS on behalf of this client.

30 Claims, 9 Drawing Sheets

FIG. 5

| signa-ture info | client certif-icate | MTS certif-icate | validity period | ETS certif-icate | certificate signature |
|---|---|---|---|---|---|
| 510 | 520 | 530 | 540 | 550 | 560 |

(optional)

500

FIG. 6    First and Second Preferred Embodiments

FIG. 8  Fourth Preferred Embodiment

EXTENDING SSL TO A MULTI-TIER ENVIRONMENT USING DELEGATION OF AUTHENTICATION AND AUTHORITY

FIELD OF THE INVENTION

The present invention relates to a computer system, and deals more particularly with a method, system, and computer-readable code for delegating authentication and authority from a client to a server in order that the server can establish a secure connection (using SSL or an analogous security protocol) to a back-end application on behalf of the client.

DESCRIPTION OF THE RELATED ART

Secure Sockets Layer, or "SSL", is a networking protocol developed by Netscape Communications Corp. and RSA Data Security, Inc. to enable secure network communications in a non-secure environment. More particularly, SSL is designed to be used in the Internet environment, where it operates as a protocol layer above the TCP/IP (Transmission Control Protocol/Internet Protocol) layers. The application code then resides above SSL in the networking protocol stack. After an application (such as a browser) creates data to be sent to a peer in the network, the data is passed to the SSL layer where various security procedures are performed on it, and the SSL layer then passes the transformed data on to the TCP layer. On the receiver's side of the connection, after the TCP layer receives incoming data it passes that data upward to the SSL layer where procedures are performed to restore the data to its original form, and that restored data is then passed to the receiving application. The most recent version of SSL is described in detail in "The SSL Protocol, Version 3.0", dated Nov. 18, 1996 and available on the World Wide Web ("Web") at http://home.netscape.com/eng/ssl3/draft302.txt (hereinafter, "SSL specification").

The protocols underlying the Internet (TCP/IP, for example) were not designed to provide secure data transmission. The Internet was originally designed with the academic and scientific communities in mind, and it was assumed that users of the network would be working in non-adversarial, cooperative manners. As the Internet began to expand into a public network, usage outside these communities was relatively limited, with most of the new users located in large corporations. These corporations had the computing facilities to protect their user's data with various security procedures, such as firewalls, that did not require security to be built into the Internet itself. In the past several years, however, Internet usage has skyrocketed. Millions of people now use the Internet and the Web on a regular basis. (Hereinafter, the terms "Internet" and "Web" are used synonymously unless otherwise indicated.) These users perform a wide variety of tasks, from exchanging electronic mail messages to searching for information to performing business transactions. These users may be accessing the Internet from home, from their cellular phone, or from a number of other environments where security procedures are not commonly available. To support the growth of the Internet as a viable place to do business, often referred to as "electronic commerce" or simply "e-commerce", easily-accessible and inexpensive security procedures had to be developed. SSL is one popular solution, and is commonly used with applications that send and receive data using the HyperText Transfer Protocol ("HTTP"). HTTP is the protocol most commonly used for accessing that portion of the Internet referred to as the Web. When HTTP is used with SSL to provide secure communications, the combination is referred to as "HTTPS". Non-commercial Internet traffic can also benefit from the security SSL provides. SSL has been proposed for use with data transfer protocols other than HTTP, such as Simple Mail Transfer Protocol ("SMTP") and Network News Transfer Protocol ("NNTP").

SSL is designed to provide several different but complementary types of security. First is message privacy. Privacy refers to protecting message content from being readable by persons other than the sender and the intended receiver(s). Privacy is provided by using cryptography to encrypt and decrypt messages. SSL uses asymmetric cryptography, also known as public-key cryptography. A message receiver can only decrypt an encrypted message if he has the proper private key and decryption algorithm that are associated with the message creator's public key. Second, SSL provides data integrity for messages being transmitted. Data integrity refers to the ability for a message recipient to detect whether the message content was altered after its creation (thus rendering the message untrustworthy). A message creator passes the message through an algorithm which creates what is called a "message digest", or "message authentication code". This digest is sent along with the message. When the message is received, the receiver also processes the message through an algorithm, creating another digest. If the digest computed by the receiver does not match the digest sent with the message, then it can be assumed that the message contents were altered in some way after the message was created. The third security feature SSL provides is known as authentication. Communications over the Internet take place as a sequence of electronic signals, without the communicating parties being able to see each other and visually determine with whom they are communicating. Authentication is a technique that helps to ensure that the parties are who they represent themselves to be—whether the party is a human user or an application program. For example, if a human user is buying goods over the Internet using a credit card, it is important for him to know that the application waiting on the other end of the connection for his credit card information is really the vendor he believes he is doing business with, and not an impostor waiting to steal his credit card information.

These security features are very powerful, and provide a high degree of protection for Internet users. However, SSL was designed as a two-party protocol, to be used in a client/server environment. The SSL protocol provides for a client to request a secure communication session by sending a message to a server application. The server then responds, and a sequence of messages are exchanged in a handshaking protocol where the various security-related parameters are negotiated. The encryption algorithms to be used for message privacy and data integrity are agreed upon, and both the client and server may authenticate each other's identity. (SSL also provides modes where the client and server are not authenticated, but those modes are not pertinent to the present discussion.) Authentication is performed during the handshake by exchanging digital certificates. (Digital certificates will be discussed in more detail below.) The server sends its certificate to the client, enabling the client to authenticate the server's identity. The server then requests the client's certificate, which the client sends in order that the server can also authenticate the client's. identity. If the authentication results are acceptable, the parties complete the handshake, and begin to exchange encrypted application data over the secure session they have established.

The client-server model for network computing is being extended in the Web environment to what is referred to as a "three-tier architecture". This architecture places the Web server in the middle tier, where the added third tier typically represents a back-end legacy application, or data repositories of information that may be accessed by the Web server as part of the task of processing the client's request. This three-tiered architecture recognizes the fact that many client requests do not simply require the location and return of static data by the Web server, but require an application program to perform processing of the client's request in order to dynamically create and format the data to be returned. In this architecture, the Web server may be referred to as an "application server", or "middle-tier server". For example, a human user interacting with a Web browser on his computer may access a transaction server such as CICS® by sending a CICS request to a Web server, where this request is then forwarded from the Web server on to the CICS server. ("CICS" is a registered trademark of the International Business Machines Corporation, hereinafter "IBM".) The CICS server processes the request, and sends a response back to the Web server, which then forwards the response back to the client software in the user's browser. The Web server acts as the middle-tier server ("MTS"), while the CICS server acts as an "end-tier" server ("ETS"). Other types of back-end legacy applications, such as relational database management systems, may be accessed using this approach as well.

SSL may be used to establish a secure session between the client and the MTS. Because SSL is strictly a two-party protocol, however, there is currently no way to extend this secure session into the three-tiered environment. The client authentication process within SSL is designed such that the client digitally signs data that it derives from the server's (i.e. the MTS's) certificate during the handshaking protocol. This digital signature requires the client to use its private key for encryption, and to send the resulting signature back to the MTS along with the client's certificate. The client's private key must never leave the client machine, or it would no longer meet the requirements for a private key. Thus, the MTS cannot create a digital signature on behalf of the client, because the MTS cannot learn the client's private key. Other existing techniques are equally unsatisfactory: if the MTS were to send the client's request to the ETS over a non-secure connection, then the security of the client's data would be compromised. If the MTS established a second SSL session between itself and the ETS (using existing techniques) and sent the client's request in that session, the ETS would be unable to determine the true identity of the party for whom it was performing the transaction. This is because the SSL code in the servers reports the name of its peer to the application program on that server for which SSL is being used. Thus, the SSL code in the ETS will report to its application that its peer is the MTS. If the MTS services thousands of clients, for example, the ETS would view them all as being the same client: the MTS, which is the only peer the ETS knows about. Many ETSs will execute applications that require access control checks to be performed, whereby a list of authorized users (not to be confused with authenticated users) is used to limit access to information and services. Access logs may also be used, where the application records identifying information for each user of the application's information or services. In such situations, it is necessary to know the identity of the true client—that is, the client in the first tier. There may be many situations other than access control where the true client identity is needed, where the requirement for knowing the identity may or may not be related to security concerns.

One technique by which a client/server session can be authenticated is to use the Kerberos network authentication protocol, which was developed by Massachusetts Institute of Technology. Kerberos provides techniques for delegating authentication, but it is based on the use of secret-key (or private key) cryptography, with keys that are stored in an escrow system. Section 1.0 of the SSL specification states that public-key cryptography will be used for authentication, thus ruling out Kerberos as a viable approach for extending SSL.

Accordingly, a need exists for a technique for extending SSL into the three-tier architecture in a manner that allows the true client's identity to be known to the ETS. The present invention provides several alternative solutions to this problem, whereby the client delegates authority and authentication to the MTS in order that the MTS can establish a second SSL session to the ETS on behalf of this client.

SUMMARY OF THE INVENTION

An object of the present invention is to provide a technique whereby SSL can be extended into the three-tier architecture in a manner that allows the true client's identity to be known to the ETS.

Another object of the present invention is to provide this technique by delegating authority and authentication from the client to the MTS.

It is an object of the present invention to provide several alternative embodiments for a solution to this delegation process.

Still another object of the present invention is to provide a technique whereby digitally signed documents are used to enable this delegation to occur.

It is another object of the present invention to provide a technique whereby X.509 certificates are used to enable this delegation to occur.

A further object of the present invention is to provide a technique whereby the MTS involves the client in the handshaking process with the ETS.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process for use in a computing environment having a connection to a network, for delegating authority and authentication from a client to a middle-tier server (MTS). This computer-readable code, system, or method comprises: establishing a first secure session between a client security implementation operating at the client, the client also having a client application operating therein, and an MTS security implementation operating at the MTS, the MTS also having an MTS application operating therein; and establishing a second secure session between the MTS security implementation and an end-tier security implementation operating at an end-tier server (ETS), the ETS also having an ETS application operating therein, wherein the MTS security implementation establishes the second secure session on behalf of an identity of the client application.

In one aspect, establishing the second secure session further comprises: in the MTS security implementation, requesting an X.509 delegate certificate from the client security implementation; in the client security implementation, responsive to the request from the MTS security implementation, creating the X.509 delegate certificate and sending the created delegate certificate to the MTS security implementation; in the MTS security implementation, receiving the delegate certificate sent from the client security implementation and forwarding the received delegate certificate to the end-tier security implementation along with a certificate for the client; and in the end-tier security implementation, extracting a subject identity from the forwarded delegate certificate, wherein the extracted identity is the identity of the client application.

In another aspect, establishing the second secure session further comprises: in the MTS security implementation, requesting an X.509 delegate certificate from the client security implementation; in the client security implementation, responsive to the request from the MTS security implementation, creating the X.509 delegate certificate and sending the created delegate certificate to the MTS security implementation; in the MTS security implementation, receiving the delegate certificate sent from the client security implementation and forwarding the received delegate certificate to the end-tier security implementation along with a certificate and a certificate hierarchy for the client; and in the end-tier security implementation, extracting a subject identity from the forwarded certificate hierarchy, wherein the extracted subject identity is the identity of the client application.

In yet another aspect, establishing the second secure session further comprises: in the MTS security implementation, requesting a signed delegate document from the client security implementation; in the client security implementation, responsive to the request from the MTS security implementation, creating the signed delegate document and sending the created delegate document to the MTS security implementation; in the MTS security implementation, receiving the delegate document sent from the client security implementation and forwarding the received delegate document to the end-tier security implementation along with a certificate for the MTS; and in the end-tier security implementation, extracting a subject identity from the forwarded delegate document, wherein the extracted subject identity is the identity of the client application.

In still another aspect, establishing the second secure session further comprises: in the MTS security implementation, requesting a signed delegate document from the client security implementation; in the client security implementation, responsive to the request from the MTS security implementation, creating the signed delegate document and sending the created delegate document to the MTS security implementation; in the MTS security implementation, receiving the delegate document sent from the client security implementation; in the MTS security implementation, receiving a certificate request from the end-tier security implementation and forwarding a further certificate request to the client security implementation wherein the further certificate request contains an identification of the end-tier application; in the client security implementation, responsive to the further certificate request from the MTS security implementation, creating a further signed delegate document based on the identification of the end-tier application, and wherein the further signed delegate document specifies the identification, and sending the created further delegate document to the MTS security implementation; in the MTS security implementation, receiving the further delegate document sent from the client security implementation and forwarding the received further delegate document to the end-tier security implementation along with a certificate for the MTS; and in the end-tier security implementation, extracting a subject identity and the identification from the forwarded further delegate document, wherein the extracted subject identity is the identity of the client application, and verifying that the extracted identification is an identification of the extracting end-tier security implementation.

In another aspect, establishing the second secure session further comprises: in the MTS security implementation, receiving a certificate request from the end-tier security implementation; in the MTS security implementation, receiving the certificate request and forwarding a further certificate request to the client security implementation wherein the further certificate request comprises a collection of handshaking data received from the end-tier security implementation; in the client security implementation, responsive to the further certificate request from the MTS security implementation and based upon an identification of the end-tier application extracted from the handshaking data, creating a digital signature and sending the digital signature embedded in a message to the MTS security implementation; in the MTS security implementation, receiving the message sent from the client security implementation, extracting the digital signature, and forwarding the extracted digital signature to the end-tier security implementation along with a certificate for the client; and in the end-tier security implementation, extracting the identity of the client application from the forwarded certificate for the client.

In yet another aspect, establishing the second secure session further comprises: in the MTS security implementation, receiving a certificate request from the end-tier security implementation; in the MTS security implementation, responsive to receiving the certificate request, extracting a name of the client application from a client certificate receiving during the first secure session establishment; in the MTS security implementation, creating a temporary public key, private key pair for representing the client application; in the MTS security implementation, creating an X.509 delegate certificate, the created delegate certificate comprising the extracted name and the temporary public key; in the MTS security implementation, forwarding the created delegate certificate to the end-tier security implementation along with a digital signature created by the MTS security implementation using the temporary private key; and in the end-tier security implementation, extracting a subject identity from the forwarded delegate certificate, wherein the extracted identity is the identity of the client application. This aspect may further comprise in the MTS security implementation, storing the created key pair and the created delegate certificate for use with any subsequent first secure sessions between the client security implementation and the MTS security implementation.

Preferably, the client security implementation, MTS security implementation, and end-tier security implementation will use a Secure Sockets Layer protocol or a Transaction Layer Security protocol.

The present invention will now be described with reference to the following drawings, in which like reference numbers denote the same element throughout.

BRIEF DESCRIPTION OF THE DRAWINGS

FIG. 5 depicts the format of a signed document that is used with the third embodiment of the present invention.

DESCRIPTION OF THE PREFERRED EMBODIMENT

Figure 1:
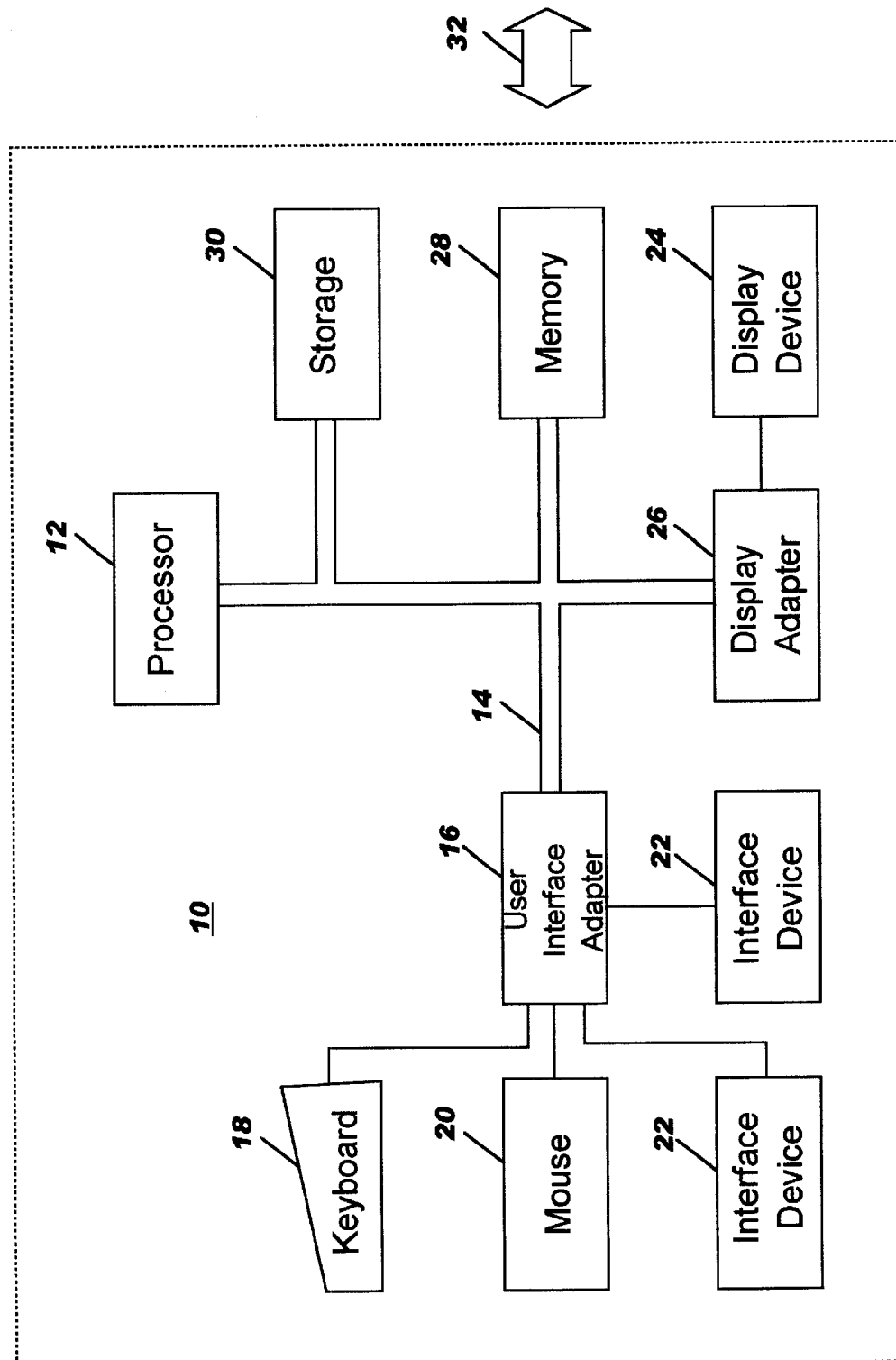
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
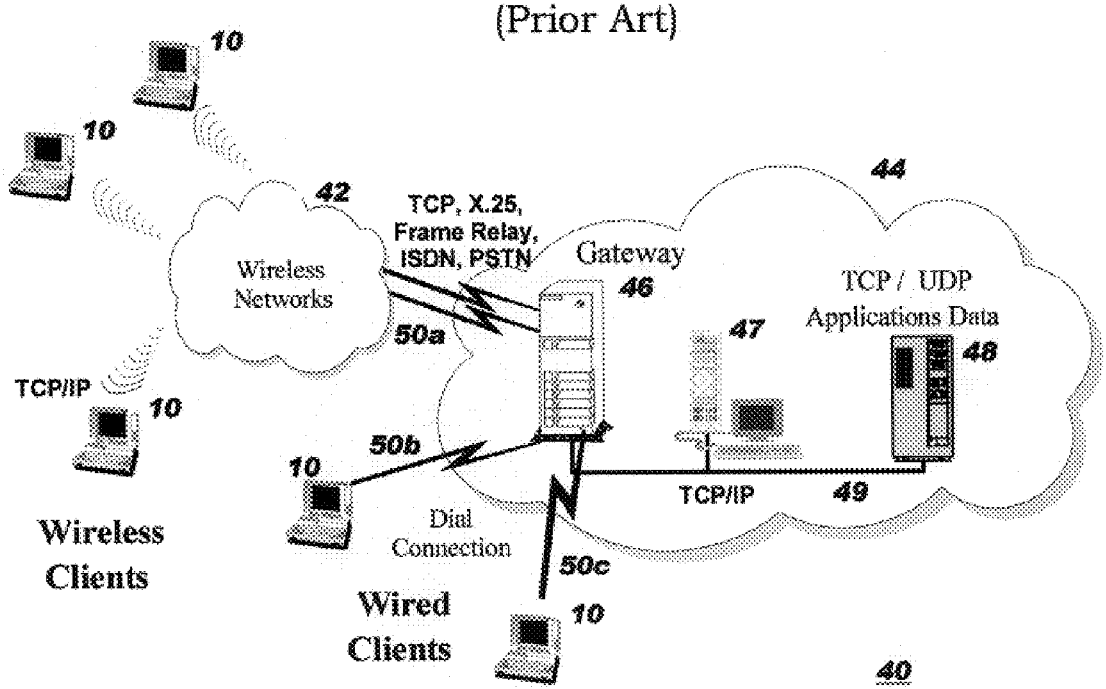
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention at a client computer may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the various alternative preferred embodiments, the present invention is implemented as one or more computer software programs. The software may be implemented as one or more modules (also referred to as code subroutines, or "objects" in object-oriented programming) which are invoked upon request. The location of the software (whether on the client workstation, MTS, and/or ETS) will differ for the various alternative embodiments, as discussed below with reference to each embodiment. The logic implementing the delegation may be integrated with the code of a program which implements the SSL protocol, or it may be implemented as one or more separate utility modules, which provide services that are invoked by such a program, without deviating from the inventive concepts disclosed herein. The MTS may be functioning as a Web server, where that Web server provides services in response to requests from a client connected through the Internet. Alternatively, the MTS may be in a corporate intranet or extranet of which the client's workstation is a component, or in any other network environment.

The preferred embodiment of the present invention will now be discussed in more detail with reference to FIGS. 3 through 9.

Figure 3:
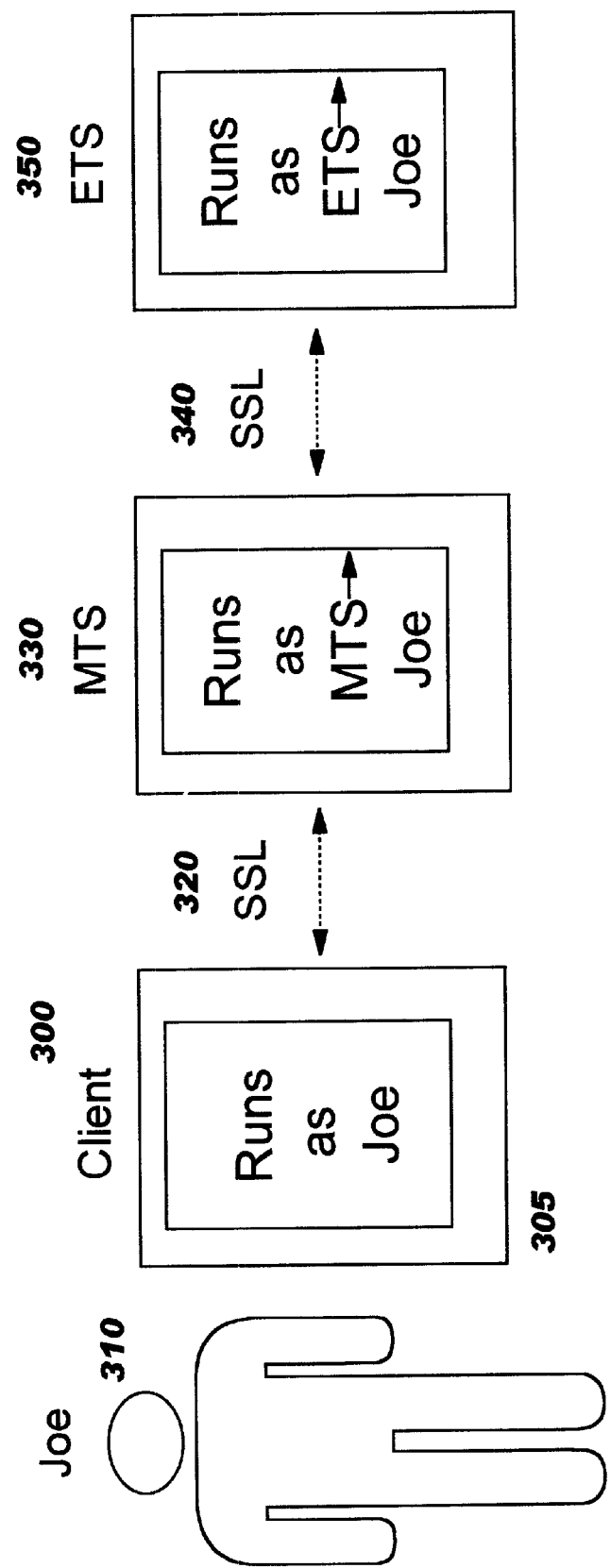
FIG. 3 illustrates the three-tier architecture in which the present invention is practiced.

FIG. 3 illustrates the three-tier architecture in which the present invention operates, at a high-level perspective. In the first tier is a client application 300, which typically is being operated by a human user 310. The client application may provide any of a myriad of services to this user. Suppose, for example, that user "Joe" 310 is using a hypothetical application provided by the Internal Revenue Service ("IRS") to see how much withholding tax he has paid. The client application 300 running on his computer 305 may be a browser that is connected to the Internet, with which he makes a secure connection 320 using SSL. His peer for this connection is a program executing on IRS server 330, the MTS. This MTS 330, after determining that user Joe 310 is who he claims to be and is entitled to know this personal information, may need to access another computer or system such as a relational database manager, in order to locate the information Joe needs. In FIG. 3, the location of this other information as shown as element 350, in the third tier (the ETS). To avoid passing Joe's private tax information between MTS 330 and ETS 350 in a non-secure manner, MTS 330 needs to establish a second secure connection 340, also using SSL. The present invention provides several alternative embodiments that enable creation of this second session while identifying the true client Joe 310 to the ETS 350.

Five alternative preferred embodiments of the present invention will now be described. Each alternative embodiment provides an independent technique for extending SSL into the three-tier environment using delegation of authentication and authority. The embodiments are intended to be used independently from one another.

Note that in the SSL protocol, a distinction is made between a secure connection and a secure session. A secure session is a logical concept whereby one client and one server communicate. A secure connection is a physical concept, representing the actual network connection underlying the session. A secure session may span multiple connections. For purposes of the present discussion, the terms "session" and "connection" are to be considered synonyms for the SSL session concept, unless otherwise indicated.

Further, it should be noted that the inventive concepts disclosed herein apply equally to the Transaction Layer Security (TLS) specification, which is designed as a follow-on security technique that will replace SSL. SSL will end with Version 3.0, and TLS will begin with a Version 1.0 that is based on the SSL Version 3.0 specification. TLS is being standardized by a working group of the IETF (Internet Engineering Task Force), and is documented in "The TLS Protocol, Version 1.0", dated Nov. 12, 1998. An RFC number has not yet been assigned to this specification. The SSL messages on which the present invention is based, and the sequence in which these messages are exchanged, are analogous to the definition of the TLS protocol. The following discussions are in terms of the SSL protocol alone for ease of reference, but it will be obvious to one of ordinary skill in the art how the preferred embodiments may be adapted for use with TLS. Where a "new record type" is referred to in the following discussions, that will be a new identifier in the SSL protocol or TLS protocol, as appropriate.

An SSL session begins with the client initiating a request to a server using a "Client Hello" message. The server then responds with a "Server Hello" message. This process sets up the security capabilities for the secure session. When server authentication is being used, as it is for the present invention, the server then sends its digital certificate using the "Certificate" message, followed by a request for the client's certificate (using the "Certificate Request" message). The server then sends a "Server Hello Done" message to indicate that the server has no more messages to transmit for the Hello phase of the handshake. These message exchanges are shown in the figures as follows: "Client Hello" at 601 in FIG. 6, 701 in FIG. 7, 801 in FIG. 8, and 901 in FIG. 9; and the sequence "Server Hello", server's "Certificate", "Certificate Request", and "Hello Done" at each of 602, 702, 802, and 902. At this point, the client performs authentication of the server. A number of steps are involved in this authentication process, including: checking that the server's certificate has not expired, and that it was issued by a trusted certificate authority; checking the protocol version and encryption techniques in the Server Hello to ensure that they are compatible with what the client proposed in the Client Hello; etc. If the authentication has a satisfactory outcome, the client then sends its certificate to the server using the "Certificate" message. A sequence of additional messages is then exchanged between the client and server, after which secure data transmission can begin. This process is known as the handshaking protocol, and is described in detail in the SSL specification. The discussion of the alternative preferred embodiments below begins at the point in this protocol flow where the client sends it certificate, as the details of the earlier messages are not pertinent to the present invention.

SSL is designed to be an extensible protocol, so that new record types can be introduced without requiring creation of a new protocol (and the possible introduction of security weaknesses). The present invention takes advantage of this extensibility by defining several new record types for use in the novel delegation techniques disclosed herein, as will now be discussed in detail. (Record identifiers for these new record types have not been specified herein. It will be obvious to one of ordinary skill in the art that any record identifier may be used provided that identifier has not already been assigned and provided that the sending and receiving implementations are adapted to use the same identifiers for the same messages.) In the preferred embodiments, the messages using these new record types will be transmitted after the SSL handshake is completed so that they will not interfere with the existing handshake specification and so that they may take advantage of the SSL session's security. However, in an alternative approach the messages may be sent during the handshaking protocol (as a new part of this protocol), without deviating from the inventive concepts disclosed herein. What is required is that the SSL code on the sending and receiving devices is adapted to properly send and receive the new messages (e.g. the MTS expects to receive the message at the same point in the exchange where the client is sending the message), so that a protocol error is not generated.

First Preferred Embodiment

Figure 4:
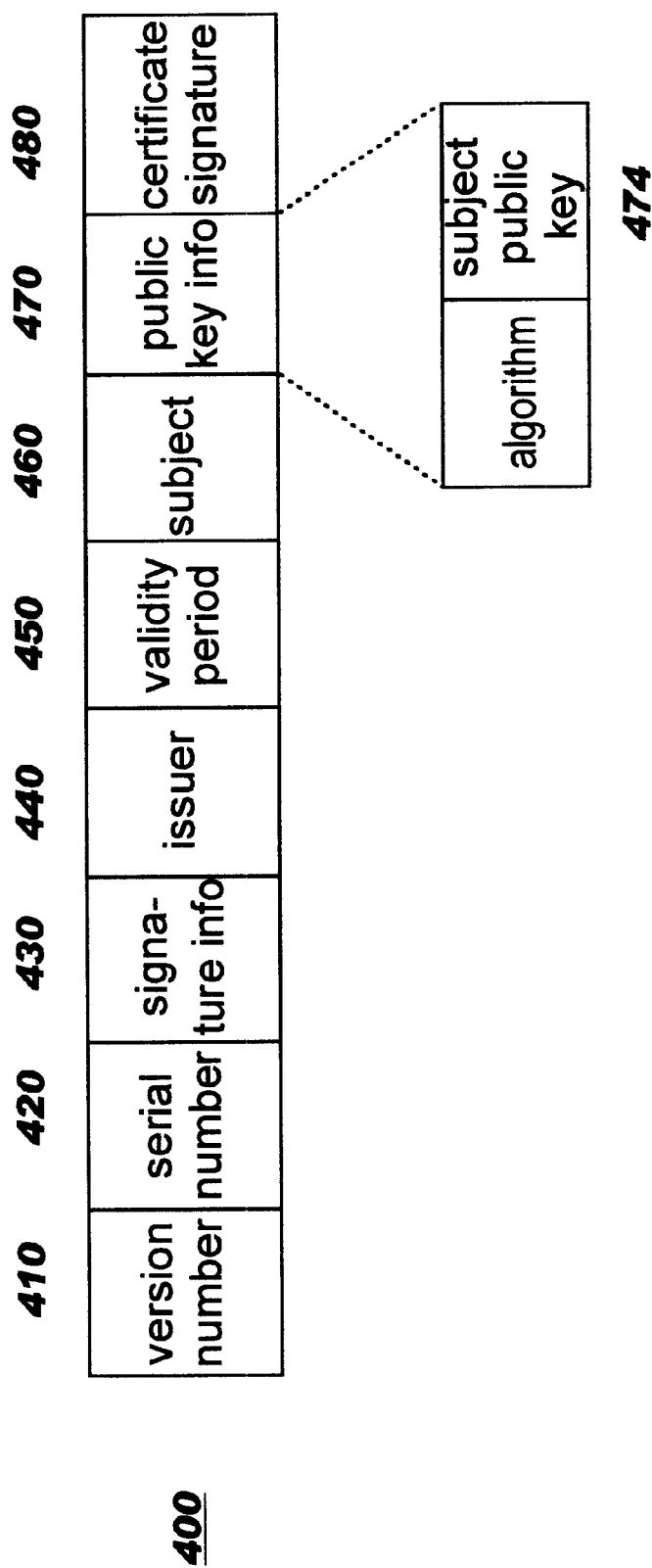
FIG. 4 depicts the format of an X.509 certificate that is used with the first, second and fifth embodiments of the present invention.

In a first preferred embodiment, the client software creates a new certificate from information obtained during the handshaking process with the MTS that occurs as the client-to-MTS SSL session 320 is being established. This new certificate is an X.509 Version 3 certificate, and is for subsequent use by the MTS. X.509 is an ITU Recommendation and International Standard that defines a framework for providing authentication. (See "ITU Recommendation X.509 (1997) Information Technology—Open Systems Interconnection—The Directory: Authentication Framework", hereinafter "Directory specification", dated 11/93. This information is also published in International Standard ISO/IEC 9594-8 (1995).) A certificate format is defined in this standard. Certificates created according to this international standard, in the defined format, are referred to as "X.509 certificates". The format of an X.509 certificate is shown in FIG. 4.

The client sends its own client certificate to the MTS during the handshaking protocol, using a "Certificate" message 603 according to the existing SSL protocol definition. (The certificate sent by a client or server using the "Certificate" message may comprise a single certificate, or a certificate chain, according to the SSL specification. A certificate chain is an inorder sequence of certificates, beginning with the certificate of the sender and proceeding sequentially upward through the certificate hierarchy. The receiver of a certificate is able to process a chain or a single certificate. These concepts are well known in the art.) The client also sends a "Certificate Verify" message at this point, into which the client puts a digital signature to verify its signing ability. The MTS receives the client certificate, and authenticates the client in the normal manner. The client sends a message 604 to the MTS, requesting the MTS to perform some type of processing. (This message is designated "Client Transaction Request" in FIG. 6. This designation is being used in a generic manner to represent an application-specific request being communicated between the application residing on the client and the application residing on the MTS. The content of this message does not form part of the present invention.) Note that FIGS. 6 through 9 show the Client Transaction Request (message 604, 704, 804, and 904) being sent before the delegation processing begins, so that the transaction being requested in this message may indicate the need to create the second secure session 340, and the delegation processing described herein to create that session. However, it is also possible that the need for a second secure session is known before receiving the client's request (as may be the case, for example, where the application residing on the MTS always needs to use the services of a third-tier server). In this latter situation, the Client Transaction Request may occur later in the message exchange than what is shown in the figures, provided that it precedes the MTS Transaction Request (message 610, 710, 810, and 908).

At 605, the MTS sends a request for a delegate certificate (using a new record type), according to this embodiment of the present invention.

The client then creates the X.509 certificate 400 to be used for delegation. The client sets the version number 410 to indicate the version of X.509 certificate being used (normally version 3), and generates a number to insert into the serial number field 420 according to the X.509 specification (i.e. a unique number that associates the certificate issuer in field 440 with the subject in field 460). The signature field 430 is set to a value that indicates what kind of digital signature is being used for field 480. The issuer field 440 is set to the client's distinguished name from the client's certificate (i.e. the certificate sent at 603), to indicate that the client is the issuer of this new certificate. (A distinguished name is an identifier having a specific format, as is well known to those of ordinary skill in the art.)

Preferably, the validity period 450 (which contains a start date and time, and an end date and time) will be set to reflect some relatively short duration period. This is because the certificate is to be used only for this. secure session, which will typically have a short duration. In addition, minimizing the validity period makes it less likely that an unauthorized party could steal the certificate and use it in a malicious manner. That is, if the security of the MTS was to be compromised, any certificates that the MTS had received from clients and had retained copies of could be collected by the intruder. If any of these certificates were still valid, the intruder could use them to impersonate the client that sent the certificate. By minimizing the validity period, the exposure to this type of attack is minimized. Other restrictions may be added to the certificate being created, depending on the needs of the client application, using X.509 V3 extensions. Such extensions are not a required part of the present invention. Certificate revocation lists ("CRLs"), however, would not be used because the validity period of the certificate will be too short for CRLs to be an effective technique for reducing exposure to security compromises. More information on these X.509 V3 extensions may be found in "ITU-T Recommendation X.509 (1997 E): Information Technology—Open Systems Interconnection—The Directory: Authentication Framework", dated June 1997.

The client's distinguished name is also stored into the subject name field 460. The algorithm field 472 is set to indicate what type of cryptographic algorithm (such as RSA, Diffie-Hellman, etc.) is to be used. The client then extracts the server's public key from the MTS's certificate sent at 602, and inserts the extracted key value into the public key field 474. By creating this certificate, the client is binding its name at 460 with the MTS's public key at 474. This binding enables the ETS to later report the first-tier client's name upward from SSL to the application running on the ETS (without changes to the existing SSL protocol on the ETS), as being the name of the ETS's peer, while still using the MTS's public key to determine the private key to use for decryption of the MTS's messages. The client then creates a digital signature of the information in the certificate 400, using the private key that matches the public key in the client certificate sent at 603, and inserts this value into field 480. Techniques for creating digital signatures are well known in the art, and will not be described in detail herein.

The newly-created delegate certificate is sent at 606 using a new record type which identifies that what is being sent is the client-created certificate to be used for delegation purposes. When the newly-created certificate is received at the MTS, the MTS simply retains it for later use.

After the secure session 320 is established and the MTS has received the delegate certificate, the MTS then begins establishment of the second session 340. The MTS now functions as a client in the SSL protocol, sending the "Client Hello" message to the ETS at 607. The ETS responds with the "Server Hello" and its server certificate, and asks the MTS for its client certificate, at 608 according to the normal protocol flow. In the existing SSL protocol flow, the MTS would respond by sending its server certificate at this time, using the "Certificate" message. However, to enable delegation to occur, at 609 the MTS sends a certificate chain comprising: (1) the certificate that the client created (described above as the delegate certificate) and sent to the MTS during establishment of the first secure session 320 (at 606), and (2) the client's certificate (sent to the MTS at 603). In addition, the MTS sends a "Certificate Verify" message at this time, which is signed by the MTS using its own private key (which will match the public key 474 in the delegate certificate).

The ETS receives these certificates sent at 609, and verifies them by constructing a certificate chain. Certificate chains and the verification thereof are known in the art, and thus will not be described in detail. The ETS performs a client authentication process, according to the SSL specification, and completes the handshaking protocol. A second secure session 340 has now been created, using delegation of the client's authentication and authority. All subsequent data transmitted from the MTS to the ETS over this secure session 340 appears to the ETS as though it is coming from the client in the first tier.

Using the information from the delegate certificate that was sent to the ETS enables the ETS to have the public key 474 of the MTS, and the subject 460 which is the distinguished name of the client. The SSL code executing on the ETS will report this name 460 to the application program, enabling the identification of the true client to be known at the third tier. The manner in which the application program uses the name is application dependent, and does not form part of the present invention. As an example of the application-dependent processing, if access control is being used on the ETS as previously described, the application program will compare this name to its list (or other representation) of authorized users. If the name is authorized, then the application will process the request that is being made on behalf of the first-tier client; otherwise, the request will be rejected.

The MTS sends a message 610 to the ETS, to request application-specific processing. As discussed above with reference to message 604, the designation "MTS Transaction Request" is used in FIG. 6 in a generic manner to represent an application-specific request, where this request is being communicated between the application residing on the MTS and the application residing on the ETS. The content of message 610 does not form part of the present invention.

At 611, the ETS returns the result from its application program back to the MTS, which then forwards this result on to the client at 612. (As will be obvious to one of ordinary skill in the art, the MTS may perform additional application-specific processing on this result 611 before returning it 612 to the client.)

Figure 6:
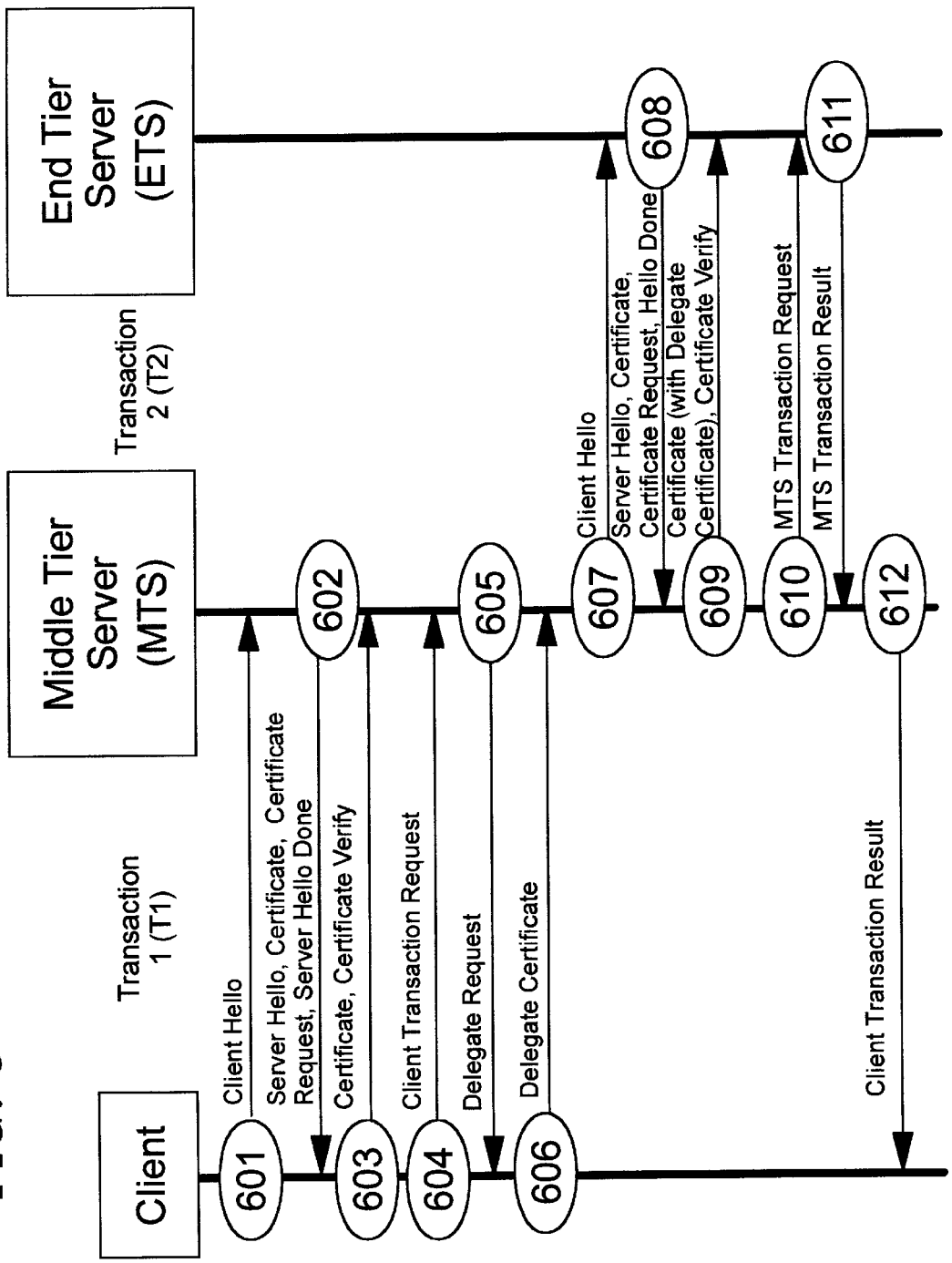
FIGS. 6–9 depict the flows involved in the preferred embodiments of the present invention.
Figure 7:
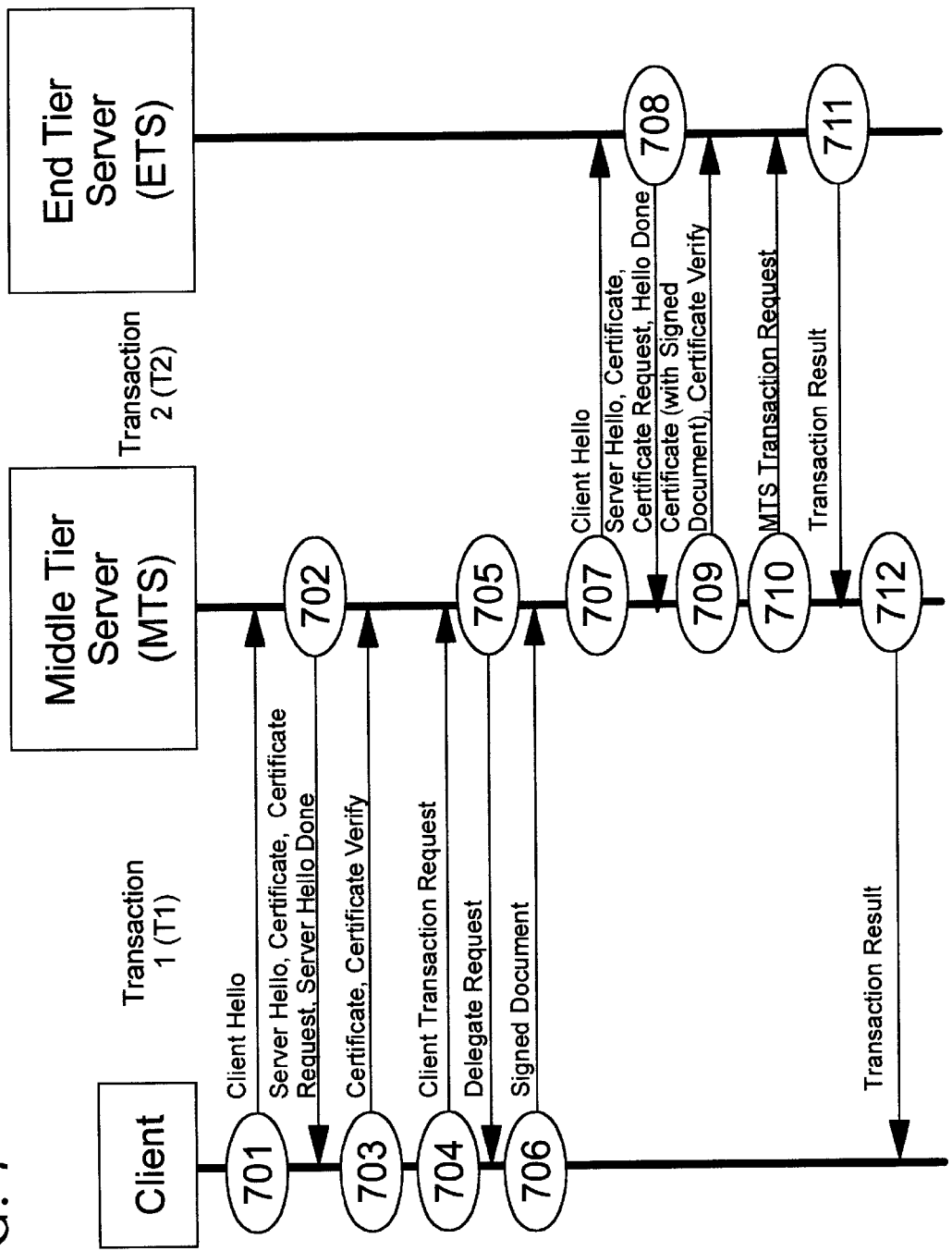
Figure 8:
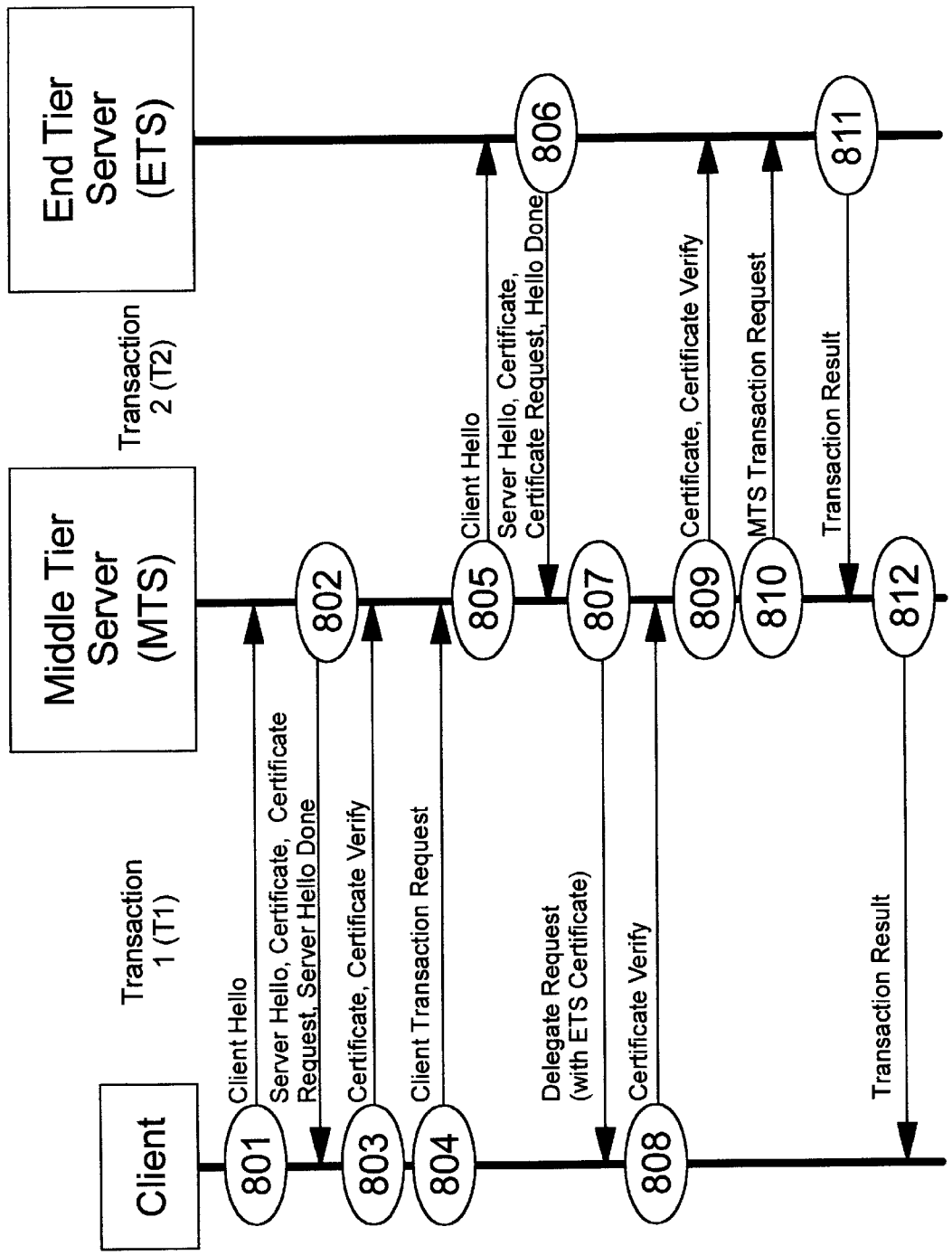
Figure 9:
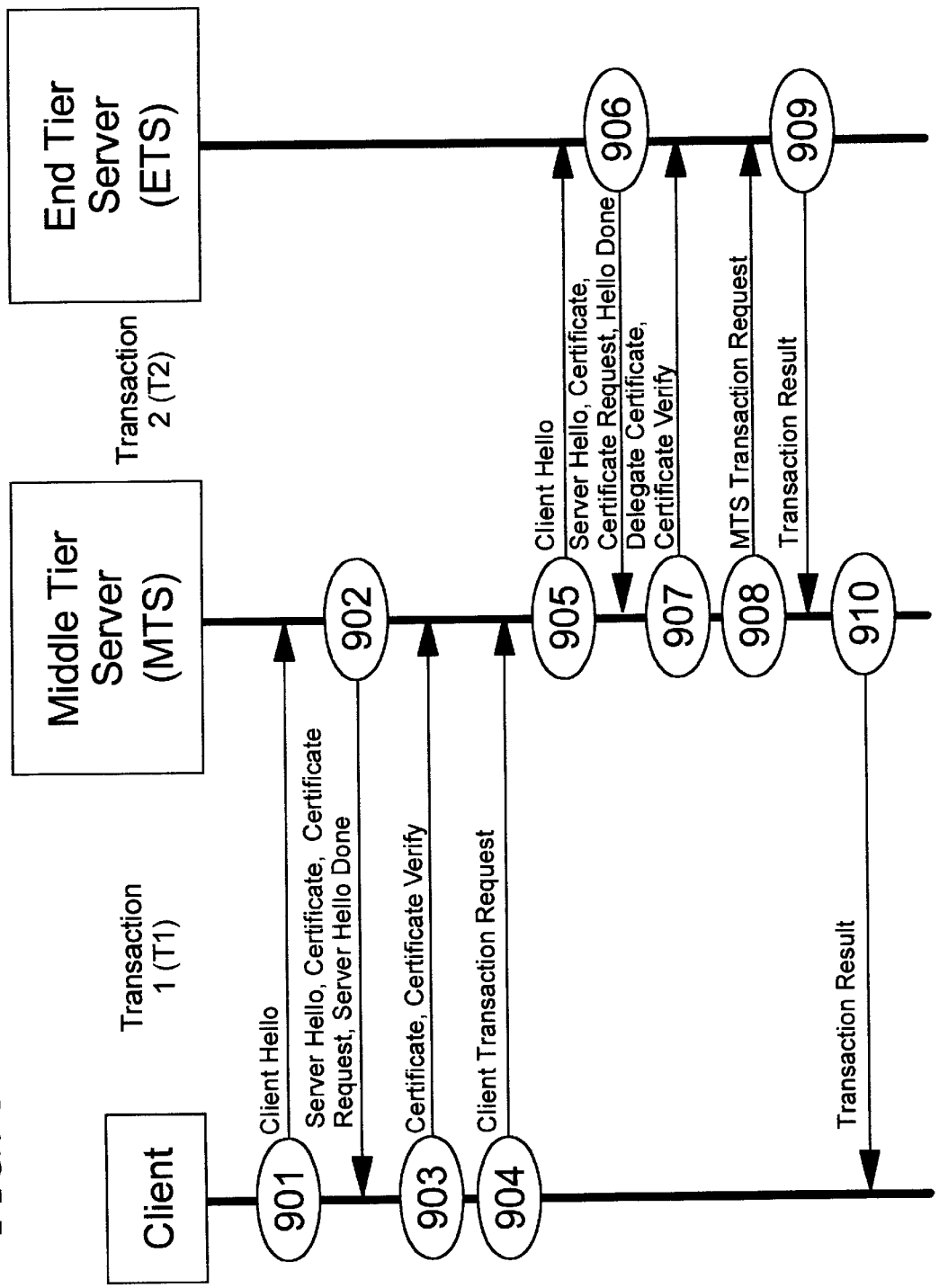

Note that FIG. 6 shows the MTS establishing a second secure session to a single ETS. It is also possible that the transaction requested in a single session 320 with a client may cause the MTS to establish subsequent sessions with more than one ETS (for example, part of the data needed by the MTS may be located on one third-tier server, while another part is located on a different third-tier server). The process with which any additional secure sessions from the MTS to other ETS's is established is identical to that described herein for the first such subsequent session. It is also possible to extend this system to allow delegation to flow through multiple MTS's before reaching the final ETS. (This applies to the alternative embodiments described below as well.)

This embodiment requires new code on the client and on the MTS, but not on the ETS. The delegation process is transparent to the ETS. This embodiment requires that the client hold a certificate that will allow the client to create further certificates—that is, to use its own name as the certificate issuer 440.

Second Preferred Embodiment

A second preferred embodiment is defined which is nearly identical to the first preferred embodiment. This second embodiment, however, requires changed code at the ETS as well as at the client and MTS. FIG. 6 may be used to describe this second embodiment, with a small number of changes that will now be described.

When the client is constructing the X.509 certificate 400, it extracts the server's name as well as the server's public key from the server's certificate that the MTS sent during the handshake (at 602). This extracted server name is used as the value of the subject field 460 (instead of the client name, which was used in the first embodiment). The remaining fields of certificate 400 are created in an identical manner to that described above for the first embodiment. This certificate thus binds the MTS named at 460 with the public key at 474, so that the private key associated with the MTS's public key will be used for decryption by the ETS.

The code required on the ETS in this embodiment provides for looking through the entire certificate chain coming from the MTS (at 609), locating the client's name as issuer 440 of the certificate 400. The SSL code on the ETS then uses this issuer name 440 (instead of the subject name 460) to pass up to the application program, so that access decisions for this session 340 will be based on the identity of the client from the first tier.

Third Preferred Embodiment

In the third preferred embodiment, the process of establishing the first secure session 320 is similar to that described above for the first preferred embodiment. However, instead of creating an X.509 certificate, the client now creates a signed document. The signed document format is shown in FIG. 5. This embodiment will now be described in detail.

The processing described for 603 through 605 of the first embodiment is identical to the processing used in this embodiment for 703 through 705. The client then creates the signed document 500 to be used for delegation. In this preferred embodiment, the signed delegate document 500 comprises: signature information at 510 (a value that indicates what kind of digital signature is being used for field 560, analogous to field 430 of FIG. 4), the client's certificate inserted at 520, the MTS's certificate at 530 (which was received at 702), a validity period 540 for the signed document, optionally a certificate from the ETS at 550 (see the following discussion for information about when this field is used), and a digital signature 560 for the signed document 500 (created by the client using the client's private key). Note that no separate public key field is required in this signed document 500, because the public key information is already embedded in the certificates that are contained within the signed document.

The signed document format 500 containing the complete client certificate 520 and MTS certificate 530 (and optionally, ETS certificate 550) is the preferred approach for this embodiment. However, other formats using less data may be used alternatively, without deviating from the inventive concepts disclosed herein. For example, instead of containing complete certificates, the signed document may contain only the distinguished names of the client and MTS (and optionally ETS), where those distinguished names are extracted from the corresponding certificates. The client would create a digital signature for this signed document, using its private key, as described above for the format 500. This technique would reduce the amount of data transmitted in the signed document, but would potentially increase the exposure to security attacks on the signed document Additional information may be added to this alternative format, such as the MTS's public key and a validity period for the signed delegate document, according to the requirements of a particular implementation.

The signed document is sent to the MTS at 706 using a new record type which identifies that what is being sent is the client-created signed document to be used for delegation purposes. Upon receiving the signed document 500, the MTS can verify that it was issued by the authenticated client which sent the client Certificate and Certificate Verify messages at 703. The MTS also retains the signed document 500 for later use.

After the secure session 320 is established and the MTS has received the signed document, the MTS then begins establishment of the second session 340. As in the first and second embodiments, the MTS functions as a client in the SSL protocol, sending the "Client Hello" message to the ETS at 707. The ETS responds with the "Server Hello" and its server certificate, and asks the MTS for its client certificate, at 708 according to the normal protocol flow. In this third embodiment, the MTS sends its own server certificate in response, using the "Certificate" message at 709. This is the same processing that occurs in the existing SSL protocol flow. However, to enable delegation to occur, in this embodiment the MTS also sends the signed delegate document at 709. In addition, the MTS sends a "Certificate Verify" message at 709, which it signs using its own private key. When the ETS receives the MTS's certificate and the delegate document, this is a signal to the ETS that delegation is to be used, and that the ETS is to use the client's identity from the client certificate in the signed delegate document) for this second secure session.

When the ETS receives the server's certificate and the signed delegate document, it first verifies the server's certificate in the normal manner and then processes the delegate document. This delegate document processing validates that the first-tier client authorized the MTS to assume the client's identity, and comprises: (1) authenticating the client's signature on the signed document; (2) checking the validity of the client's certificate; (3) checking that this second session was set up by the MTS using the certificate from the signed document; (4) optionally (as described below), checking that the ETS certificate contained in the signed delegate document is correct for this ETS; and (5) checking any additional restrictions in the signed document. Restrictions that are used in common practice for signed documents (as well as certificates) include: setting an expiration time; limiting the time of day transactions may be conducted; limiting the value of a transaction (e.g. this MTS can only request information if it is free); etc. Restrictions of this type are known in the prior art and are not claimed as part of this invention. If all these checks are satisfactory, then the ETS will accept the delegated session request and use the client's name from the client certificate in the signed document as the identity of its peer (i.e. the SSL code on the ETS will pass the client's name to the application program executing on the ETS). Otherwise, the ETS will reject the delegated session. If only distinguished names, instead of complete certificates, are contained in the signed delegate document, then the respective names from the signed delegate document should be compared to the names contained in the certificates that were used for establishing the SSL session. If names and public keys are included, then the respective public keys should be checked against the public keys used for establishing the SSL session. The objective in the cases where all certificate data is not transmitted in the signed document is to check as much of the information as possible.

The processing at 710, where the MTS sends an application-specific transaction request to the ETS, is identical to that described above for message 610. At 711, the ETS returns the result from its application program back to the MTS, which then forwards this result on to the client at 712. (As will be obvious to one of ordinary skill in the art, the MTS may perform additional application-specific processing on this result 711 before returning it 712 to the client.)

This third embodiment requires new code on the ETS (as well as on the client and MTS), and the delegation process is no longer transparent to the ETS. The client certificate for the first-tier client must be valid for signature (as interpreted by the ETS). However, this is the default requirement for client certificates for SSL use, as SSL client authentication requires signature capability; thus, no additional requirements are being imposed on the client's certification policy.

As an optional enhancement of this third embodiment, the MTS may involve the client in the process of establishing the second secure session 340. This option enables the client to separately approve each delegated session, and to limit the delegation to occurring from the MTS to a specific ETS. Instead of the MTS sending its own certificate, the signed delegate document, and the Certificate Verify message at 709, the MTS will instead send a request (which uses a new record type) back to the client at this point (not shown in FIG. 7). This request will communicate the identity of the ETS to the client, and request that the client create a signed delegate document that delegates this client's authority to this MTS for a subsequent session with this specific ETS. If the client agrees to this delegation, it creates a signed document as described above, containing the certificate 550 of the ETS (which was described above as being optional). The client then returns this signed delegate document (again, using a new record type) to the MTS (not shown in FIG. 7). The MTS forwards this new signed document 500 on to the ETS along with its own certificate and the Certificate Verify message (at the point in the message flow shown as 709). The ETS checks the signed document to ensure that its own identity is contained therein, and if so, uses the client's identity to forward to the ETS application at the ETS. Otherwise, the ETS will reject the delegated session. Message flows 710 through 712 proceed as described above.

Fourth Preferred Embodiment

In the fourth preferred embodiment, the first secure session 320 is established using existing SSL protocol flows. The messages sent at 801 through 804 are identical to those sent at 601 through 604 as well as 701 through 704.

The MTS initiates the second secure session 340 by sending a "Client Hello" message 805. The ETS responds by sending a "Server Hello" and its server certificate, and the "Certificate Request" message, at 806.

Instead of responding directly to the ETS's certificate request, according to this fourth preferred embodiment the MTS will send all of the handshake data received thus far from the ETS back to the client over session 320 at 807. In particular, this includes the "Certificate Request", as well as the ETS's certificate, which were received at 806. A new record type will be used to send this data, to inform the client that a request for delegation is being made.

Upon receiving this information from the MTS, the client may optionally perform verification of the handshake data. This verification will depend on the needs of a particular client implementation, but may include one or more checks such as: (1) authenticating the distinguished name of the ETS (from the ETS's server certificate); (2) checking that the strength of the encryption proposed by the ETS in its Server Hello is suitable to the first-tier client; (3) checking the number of such delegation requests that have been made against some threshold value; (4) presenting selected values from the handshaking data to a human user for inspection, allowing the human user to participate in the delegation authorization process; etc. If the results of this verification are satisfactory, or if no verification is performed, the client then creates a digital signature using the client's private key for the certificate that it sent originally to the MTS as a client certificate (at 803). This digital signature is sent from the client to the MTS at 808 using a Certificate Verify message embedded within a new record type. The MTS receives the message, and extracts the embedded Certificate Verify message with the client's digital signature. The MTS then sends the certificate it received from the client at 803, along with a Certificate Verify message containing the client's digital signature, to the ETS at 809. The handshake process between the MTS and ETS then completes according to the existing SSL protocol.

The processing at 810 through 812 is analogous to that described above for 610 through 612, as well as 710 through 712.

In this fourth embodiment, new code is required on the client and MTS, but not on the ETS. The client does not create a new certificate specific to this embodiment, nor a signed document. An advantage of this fourth embodiment is that the client may separately approve each session delegated from the MTS to an ETS, and the client can perform authentication of each ETS. This is because the client is involved in the protocol flow for each session created between the MTS and an ETS on the client's behalf, whereas in the first three embodiments, the MTS retained the ability to establish subsequent sessions without informing the client as long as the validity period of the X.509 certificate or corresponding expiration time of the signed document had not been exceeded. A disadvantage of this fourth embodiment, which results from the client being involved in each session establishment, is the additional traffic flows that are required between the client and the MTS.

Fifth Preferred Embodiment

In the fifth preferred embodiment, the MTS acts as a trusted certificate authority (trusted at least by the ETS). After completing the handshake with the client for the first secure session 320, the MTS extracts the client's name from the client certificate sent at 903. (The processing of 901 through 904 is identical to that described for the first four flows of the earlier embodiments). The MTS authenticates the client and its signature, according to the existing SSL specification. The MTS then creates a new temporary public key, private key pair (using techniques which are well known and do not form part of the present invention). The MTS then creates an X.509 certificate (also referred to as a delegate certificate), using the format shown in FIG. 4. The issuer field 440 is set to the identity of the MTS, and the subject field 460 is set to the extracted client name. As in the other embodiments, a relatively short validity period 450 is also set in this certificate, to minimize security exposures. The temporary public key that has just been created for the MTS is used for the value of the key field 474. The MTS creates a digital signature using the MTS's private key that matches the public key in the MTS's certificate (i.e. not the temporary private key that was just created), and inserts this into the certificate signature field 480. This delegate certificate and the temporary private key will then be used by the MTS for the subsequent SSL session with the ETS.

Optionally, the MTS may store this delegate certificate and temporary private key for later use in establishing new sessions on behalf of this first-tier client. When this option is used, after the MTS authenticates the client and completes the secure session 320, the MTS will check to see if it has a stored delegate certificate and temporary private key for this client from a prior session creation process. If so, the validity period 450 in the stored delegate certificate will be checked to ensure that the certificate has not expired. If a valid certificate is found, the MTS will bypass the delegate certificate creation process; otherwise a new delegate certificate and a new temporary key pair will be created as described above.

This fifth embodiment may also be accomplished if the MTS acts as a registration authority for a certificate authority on another machine. In this case, the MTS would simply ask the certificate authority on the other machine (where that certificate authority is trusted by the ETS) to make and sign the delegate certificate described above, instead of constructing the certificate itself, by putting the temporary public key and its own distinguished name into a Certificate Request and sending this to the certificate authority.

The MTS initiates the second secure session 340 by sending a "Client Hello" message to the ETS at 905. The ETS responds at 906 with a "Server Hello", the server's certificate, and a Certificate Request message. The MTS sends the delegate certificate 400 created by the MTS (see the above discussion) and a Certificate Verify message at 907. This Certificate Verify message is created using the MTS's temporary private key. If the ETS trusts the certificate authority that signed the MTS's delegate certificate and any other client authentication checks are satisfactory, then the ETS will accept the delegated session and extract the first-tier client's distinguished name 460 from the delegate certificate 400 to use as the identify of the ETS's peer.

The processing at 908 through 910 is analogous to that described above for the corresponding flows (610 through 612, etc.) of the earlier embodiments.

In this fifth embodiment, new code is required on the MTS, but not on the ETS or the client. Neither the client nor the ETS know that delegation is being performed. However, the ETS must be configured to trust the MTS as a certificate authority or to trust some certificate authority in the MTS's certificate hierarchy.

While the preferred embodiment of the present invention has been described, additional variations and modifications in that embodiment may occur to those skilled in the art once they learn of the basic inventive concepts. The techniques disclosed herein are based upon certain predefined characteristics of the security protocols (SSL and TLS) being processed. It will be obvious to one of ordinary skill in the art that the inventive concepts disclosed herein may be adapted to changes in the security protocols, should they occur, including complete replacement with a new protocol having the same semantics as those discussed herein. Therefore, it is intended that the appended claims shall be construed to include both the preferred embodiment and all such variations and modifications as fall within the spirit and scope of the invention.

We claim:

1. In a computing environment having a connection to a network, computer readable code readable by a computer system in said environment, for delegating authority and authentication from a client to a middle-tier server (MTS), comprising:
- a client application and a client security implementation operating at said client;
- an MTS application and an MTS security implementation operating at said MTS;
- an end-tier application and an end-tier security implementation operating at an end-tier server (ETS);
- a first subprocess for establishing a first secure session between said client security implementation and said MTS security implementation; and
- a second subprocess for establishing a second secure session between said MTS security implementation and said end-tier security implementation, wherein said MTS security implementation establishes said second secure session on behalf of an identity of said client application.

2. Computer readable code for delegating authority and authentication from a client to an MTS according to claim 1, wherein said second subprocess further comprises:
- a subprocess in said MTS security implementation for requesting an X.509 delegate certificate from said client security implementation;
- a subprocess in said client security implementation, responsive to said request from said MTS security implementation, for creating said X.509 delegate certificate and sending said created delegate certificate to said MTS security implementation;
- a subprocess in said MTS security implementation for receiving said delegate certificate sent from said client security implementation and forwarding said received delegate certificate to said end-tier security implementation along with a certificate for said client; and
- a subprocess in said end-tier security implementation for extracting a subject identity from said forwarded delegate certificate, wherein said extracted identity is said identity of said client application.

3. Computer readable code for delegating authority and authentication from a client to an MTS according to claim 1, wherein said second subprocess further comprises:
- a subprocess in said MTS security implementation for requesting an X.509 delegate certificate from said client security implementation;
- a subprocess in said client security implementation, responsive to said request from said MTS security implementation, for creating said X.509 delegate certificate and sending said created delegate certificate to said MTS security implementation;
- a subprocess in said MTS security implementation for receiving said delegate certificate sent from said client security implementation and forwarding said received delegate certificate to said end-tier security implementation along with a certificate and a certificate hierarchy for said client; and
- a subprocess in said end-tier security implementation for extracting a subject identity from said forwarded certificate hierarchy, wherein said extracted subject identity is said identity of said client application.

4. Computer readable code for delegating authority and authentication from a client to an MTS according to claim 1, wherein said second subprocess further comprises:
- a subprocess in said MTS security implementation for requesting a signed delegate document from said client security implementation;
- a subprocess in said client security implementation, responsive to said request from said MTS security implementation, for creating said signed delegate document and sending said created delegate document to said MTS security implementation;
- a subprocess in said MTS security implementation for receiving said delegate document sent from said client security implementation and forwarding said received delegate document to said end-tier security implementation along with a certificate for said MTS; and
- a subprocess in said end-tier security implementation for extracting a subject identity from said forwarded delegate document, wherein said extracted subject identity is said identity of said client application.

5. Computer readable code for delegating authority and authentication from a client to an MTS according to claim 1, wherein said second subprocess further comprises:
- a subprocess in said MTS security implementation for requesting a signed delegate document from said client security implementation;
- a subprocess in said client security implementation, responsive to said request from said MTS security implementation, for creating said signed delegate document and sending said created delegate document to said MTS security implementation;
- a subprocess in said MTS security implementation for receiving said delegate document sent from said client security implementation;
- a subprocess in said MTS security implementation for receiving a certificate request from said end-tier security implementation and forwarding a further certificate request to said client security implementation wherein said further certificate request contains an identification of said end-tier application;
- a subprocess in said client security implementation, responsive to said further certificate request from said MTS security implementation, for creating a further signed delegate document based on said identification of said end-tier application, and wherein said further signed delegate document specifies said identification, and sending said created further delegate document to said MTS security implementation;
- a subprocess in said MTS security implementation for receiving said further delegate document sent from said client security implementation and forwarding said received further delegate document to said end-tier security implementation along with a certificate for said MTS; and
- a subprocess in said end-tier security implementation for extracting a subject identity and said identification from said forwarded further delegate document, wherein said extracted subject identity is said identity of said client application, and verifying that said extracted identification is an identification of said extracting end-tier security implementation.

6. Computer readable code for delegating authority and authentication from a client to an MTS according to claim 1, wherein said second subprocess further comprises:

a subprocess in said MTS security implementation for receiving a certificate request from said end-tier security implementation;

a subprocess in said MTS security implementation for receiving said certificate request and forwarding a further certificate request to said client security implementation wherein said further certificate request comprises a collection of handshaking data received from said end-tier security implementation;

a subprocess in said client security implementation, responsive to said further certificate request from said MTS security implementation and based upon an identification of said end-tier application extracted from said handshaking data, for creating a digital signature and sending said digital signature embedded in a message to said MTS security implementation;

a subprocess in said MTS security implementation for receiving said message sent from said client security implementation, extracting said digital signature, and forwarding said extracted digital signature to said end-tier security implementation along with a certificate for said client; and a subprocess in said end-tier security implementation for extracting said identity of said client application from said forwarded certificate for said client.

7. Computer readable code for delegating authority and authentication from a client to an MTS according to claim 1, wherein said second subprocess further comprises:

a subprocess in said MTS security implementation for receiving a certificate request from said end-tier security implementation;

a subprocess in said MTS security implementation, responsive to receiving said certificate request, for extracting a name of said client application from a client certificate receiving during said first subprocess;

a subprocess in said MTS security implementation for creating a temporary public key, private key pair for representing said client application;

a subprocess in said MTS security implementation for creating an X.509 delegate certificate, said created delegate certificate comprising said extracted name and said temporary public key;

a subprocess in said MTS security implementation for forwarding said created delegate certificate to said end-tier security implementation along with a digital signature created by said MTS security implementation using said temporary private key; and a subprocess in said end-tier security implementation for extracting a subject identity from said forwarded delegate certificate, wherein said extracted identity is said identity of said client application.

8. Computer readable code for delegating authority and authentication from a client to an MTS according to claim 7, wherein said second subprocess further comprises a subprocess in said MTS security implementation for storing said created key pair and said created delegate certificate for use with any subsequent first secure sessions between said client security implementation and said MTS security implementation.

9. Computer readable code for delegating authority and authentication from a client to an MTS according to claim 1, wherein said client security implementation, said MTS security implementation, and said end-tier security implementation use a Secure Sockets Layer protocol.

10. Computer readable code for delegating authority and authentication from a client to an MTS according to claim 1, wherein said client security implementation, said MTS security implementation, and said end-tier security implementation use a Transaction Layer Security protocol.

11. A system for delegating authority and authentication from a client to a middle-tier server (MTS) in a computing environment having a connection to a network, comprising:

a client application and a client security implementation operating at said client;

an MTS application and an MTS security implementation operating at said MTS;

an end-tier application and an end-tier security implementation operating at an end-tier server (ETS);

first means for establishing a first secure session between said client security implementation and said MTS security implementation; and second means for establishing a second secure session between said MTS security implementation and said end-tier security implementation wherein said MTS security implementation establishes said second secure session on behalf of an identity of said client application.

12. The system for delegating authority and authentication from a client to an MTS according to claim 10, wherein said second means further comprises:

means in said MTS security implementation for requesting an X.509 delegate certificate from said client security implementation;

means in said client security implementation, responsive to said request from said MTS security implementation, for creating said X.509 delegate certificate and sending said created delegate certificate to said MTS security implementation;

means in said MTS security implementation for receiving said delegate certificate sent from said client security implementation and forwarding said received delegate certificate to said end-tier security implementation along with a certificate for said client; and means in said end-tier security implementation for extracting a subject identity from said forwarded delegate certificate, wherein said extracted identity is said identity of said client application.

13. The system for delegating authority and authentication from a client to an MTS according to claim 11, wherein said second means further comprises:

means in said MTS security implementation for requesting an X.509 delegate certificate from said client security implementation;

means in said client security implementation, responsive to said request from said MTS security implementation, for creating said X.509 delegate certificate and sending said created delegate certificate to said MTS security implementation;

means in said MTS security implementation for receiving said delegate certificate sent from said client security implementation and forwarding said received delegate certificate to said end-tier security implementation along with a certificate and a certificate hierarchy for said client; and means in said end-tier security implementation for extracting a subject identity from said forwarded certificate hierarchy, wherein said extracted subject identity is said identity of said client application.

14. The system for delegating authority and authentication from a client to an MTS according to claim 11, wherein said second means further comprises:
   means in said MTS security implementation for requesting a signed delegate document from said client security implementation;
   means in said client security implementation, responsive to said request from said MTS security implementation, for creating said signed delegate document and sending said created delegate document to said MTS security implementation;
   means in said MTS security implementation for receiving said delegate document sent from said client security implementation and forwarding said received delegate document to said end-tier security implementation along with a certificate for said MTS; and
   means in said end-tier security implementation for extracting a subject identity from said forwarded delegate document, wherein said extracted subject identity is said identity of said client application.

15. The system for delegating authority and authentication from a client to an MTS according to claim 11, wherein said second means further comprises:
   means in said MTS security implementation for requesting a signed delegate document from said client security implementation;
   means in said client security implementation, responsive to said request from said MTS security implementation, for creating said signed delegate document and sending said created delegate document to said MTS security implementation;
   means in said MTS security implementation for receiving said delegate document sent from said client security implementation;
   means in said MTS security implementation for receiving a certificate request from said end-tier security implementation and forwarding a further certificate request to said client security implementation wherein said further certificate request contains an identification of said end-tier application;
   means in said client security implementation, responsive to said further certificate request from said MTS security implementation, for creating a further signed delegate document based on said identification of said end-tier application, and wherein said further signed delegate document specifies said identification, and sending said created further delegate document to said MTS security implementation;
   means in said MTS security implementation for receiving said further delegate document sent from said client security implementation and forwarding said received further delegate document to said end-tier security implementation along with a certificate for said MTS; and
   means in said end-tier security implementation for extracting a subject identity and said identification from said forwarded further delegate document, wherein said extracted subject identity is said identity of said client application, and verifying that said extracted identification is an identification of said extracting end-tier security implementation.

16. The system for delegating authority and authentication from a client to an MTS according to claim 11, wherein said second means further comprises:
   means in said MTS security implementation for receiving a certificate request from said end-tier security implementation;
   means in said MTS security implementation for receiving said certificate request and forwarding a further certificate request to said client security implementation wherein said further certificate request comprises a collection of handshaking data received from said end-tier security implementation;
   means in said client security implementation, responsive to said further certificate request from said MTS security implementation and based upon an identification of said end-tier application extracted from said handshaking data, for creating a digital signature and sending said digital signature embedded in a message to said MTS security implementation;
   means in said MTS security implementation for receiving said message sent from said client security implementation, extracting said digital signature, and forwarding said extracted digital signature to said end-tier security implementation along with a certificate for said client; and
   means in said end-tier security implementation for extracting said identity of said client application from said forwarded certificate for said client.

17. The system for delegating authority and authentication from a client to an MTS according to claim 11, wherein said second means further comprises:
   means in said MTS security implementation for receiving a certificate request from said end-tier security implementation;
   means in said MTS security implementation, responsive to receiving said certificate request, for extracting a name of said client application from a client certificate receiving during said first subprocess;
   means in said MTS security implementation for creating a temporary public key, private key pair for representing said client application;
   means in said MTS security implementation for creating an X.509 delegate certificate, said created delegate certificate comprising said extracted name and said temporary public key;
   means in said MTS security implementation for forwarding said created delegate certificate to said end-tier security implementation along with a digital signature created by said MTS security implementation using said temporary private key; and
   means in said end-tier security implementation for extracting a subject identity from said forwarded delegate certificate, wherein said extracted identity is said identity of said client application.

18. The system for delegating authority and authentication from a client to an MTS according to claim 17, wherein said second means further comprises means in said MTS security implementation for storing said created key pair and said created delegate certificate for use with any subsequent first secure sessions between said client security implementation and said MTS security implementation.

19. The system for delegating authority and authentication from a client to an MTS according to claim 11, wherein said client security implementation, said MTS security implementation, and said end-tier security implementation use a Secure Sockets Layer protocol.

20. The system for delegating authority and authentication from a client to an MTS according to claim 11, wherein said client security implementation, said MTS security implementation, and said end-tier security implementation use a Transaction Layer Security protocol.

21. A method for delegating authority and authentication from a client to a middle-tier server (MTS) in a computing environment having a connection to a network, comprising the steps of:
   a first step of establishing a first secure session between a client security implementation operating at said client, said client also having a client application operating therein, and an MTS security implementation operating at said MTS, said MTS also having an MTS application operating therein; and
   a second step of establishing a second secure session between said MTS security implementation and an end-tier security implementation operating at an end-tier server (ETS), said ETS also having an ETS application operating therein, wherein said MTS security implementation establishes said second secure session on behalf of an identity of said client application.

22. The method for delegating authority and authentication from a client to an MTS according to claim 21, wherein said second step further comprises the steps of:
   in said MTS security implementation, requesting an X.509 delegate certificate from said client security implementation;
   in said client security implementation, responsive to said request from said MTS security implementation, creating said X.509 delegate certificate and sending said created delegate certificate to said MTS security implementation;
   in said MTS security implementation, receiving said delegate certificate sent from said client security implementation and forwarding said received delegate certificate to said end-tier security implementation along with a certificate for said client; and
   in said end-tier security implementation, extracting a subject identity from said forwarded delegate certificate, wherein said extracted identity is said identity of said client application.

23. The method for delegating authority and authentication from a client to an MTS according to claim 21, wherein said second step further comprises the steps of:
   in said MTS security implementation, requesting an X.509 delegate certificate from said client security implementation;
   in said client security implementation, responsive to said request from said MTS security implementation, creating said X.509 delegate certificate and sending said created delegate certificate to said MTS security implementation;
   in said MTS security implementation, receiving said delegate certificate sent from said client security implementation and forwarding said received delegate certificate to said end-tier security implementation along with a certificate and a certificate hierarchy for said client; and
   in said end-tier security implementation, extracting a subject identity from said forwarded certificate hierarchy, wherein said extracted subject identity is said identity of said client application.

24. The method for delegating authority and authentication from a client to an MTS according to claim 21, wherein said second step further comprises the steps of:
   in said MTS security implementation, requesting a signed delegate document from said client security implementation;
   in said client security implementation, responsive to said request from said MTS security implementation, creating said signed delegate document and sending said created delegate document to said MTS security implementation;
   in said MTS security implementation, receiving said delegate document sent from said client security implementation and forwarding said received delegate document to said end-tier security implementation along with a certificate for said MTS; and
   in said end-tier security implementation, extracting a subject identity from said forwarded delegate document, wherein said extracted subject identity is said identity of said client application.

25. The method for delegating authority and authentication from a client to an MTS according to claim 21, wherein said second step further comprises the steps of:
   in said MTS security implementation, requesting a signed delegate document from said client security implementation;
   in said client security implementation, responsive to said request from said MTS security implementation, creating said signed delegate document and sending said created delegate document to said MTS security implementation;
   in said MTS security implementation, receiving said delegate document sent from said client security implementation;
   in said MTS security implementation, receiving a certificate request from said end-tier security implementation and forwarding a further certificate request to said client security implementation wherein said further certificate request contains an identification of said end-tier application;
   in said client security implementation, responsive to said further certificate request from said MTS security implementation, creating a further signed delegate document based on said identification of said end-tier application, and wherein said further signed delegate document specifies said identification, and sending said created further delegate document to said MTS security implementation;
   in said MTS security implementation, receiving said further delegate document sent from said client security implementation and forwarding said received further delegate document to said end-tier security implementation along with a certificate for said MTS; and
   in said end-tier security implementation, extracting a subject identity and said identification from said forwarded further delegate document, wherein said extracted subject identity is said identity of said client application, and verifying that said extracted identification is an identification of said extracting end-tier security implementation.

26. The method for delegating authority and authentication from a client to an MTS according to claim 21, wherein said second step further comprises the steps of:
   in said MTS security implementation, receiving a certificate request from said end-tier security implementation;
   in said MTS security implementation, receiving said certificate request and forwarding a further certificate request to said client security implementation wherein said further certificate request comprises a collection of handshaking data received from said end-tier security implementation;

in said client security implementation, responsive to said further certificate request from said MTS security implementation and based upon an identification of said end-tier application extracted from said handshaking data, creating a digital signature and sending said digital signature embedded in a message to said MTS security implementation;

in said MTS security implementation, receiving said message sent from said client security implementation, extracting said digital signature, and forwarding said extracted digital signature to said end-tier security implementation along with a certificate for said client; and in said end-tier security implementation, extracting said identity of said client application from said forwarded certificate for said client.

27. The method for delegating authority and authentication from a client to an MTS according to claim 21, wherein said second step further comprises the steps of:

in said MTS security implementation, receiving a certificate request from said end-tier security implementation;

in said MTS security implementation, responsive to receiving said certificate request, extracting a name of said client application from a client certificate receiving during said first subprocess;

in said MTS security implementation, creating a temporary public key, private key pair for representing said client application;

in said MTS security implementation, creating an X.509 delegate certificate, said created delegate certificate comprising said extracted name and said temporary public key;

in said MTS security implementation, forwarding said created delegate certificate to said end-tier security implementation along with a digital signature created by said MTS security implementation using said temporary private key; and in said end-tier security implementation, extracting a subject identity from said forwarded delegate certificate, wherein said extracted identity is said identity of said client application.

28. The method for delegating authority and authentication from a client to an MTS according to claim 27, wherein said second step further comprises the step of, in said MTS security implementation, storing said created key pair and said created delegate certificate for use with any subsequent first secure sessions between said client security implementation and said MTS security implementation.

29. The method for delegating authority and authentication from a client to an MTS according to claim 21, wherein said client security implementation, said MTS security implementation, and said end-tier security implementation use a Secure Sockets Layer protocol.

30. The method for delegating authority and authentication from a client to an MTS according to claim 21, wherein said client security implementation, said MTS security implementation, and said end-tier security implementation use a Transaction Layer Security protocol.

* * * * *